A. E. BEACH.
PARCEL AND LETTER DELIVERY.
No. 49,699.                  Patented Sept. 5, 1865.
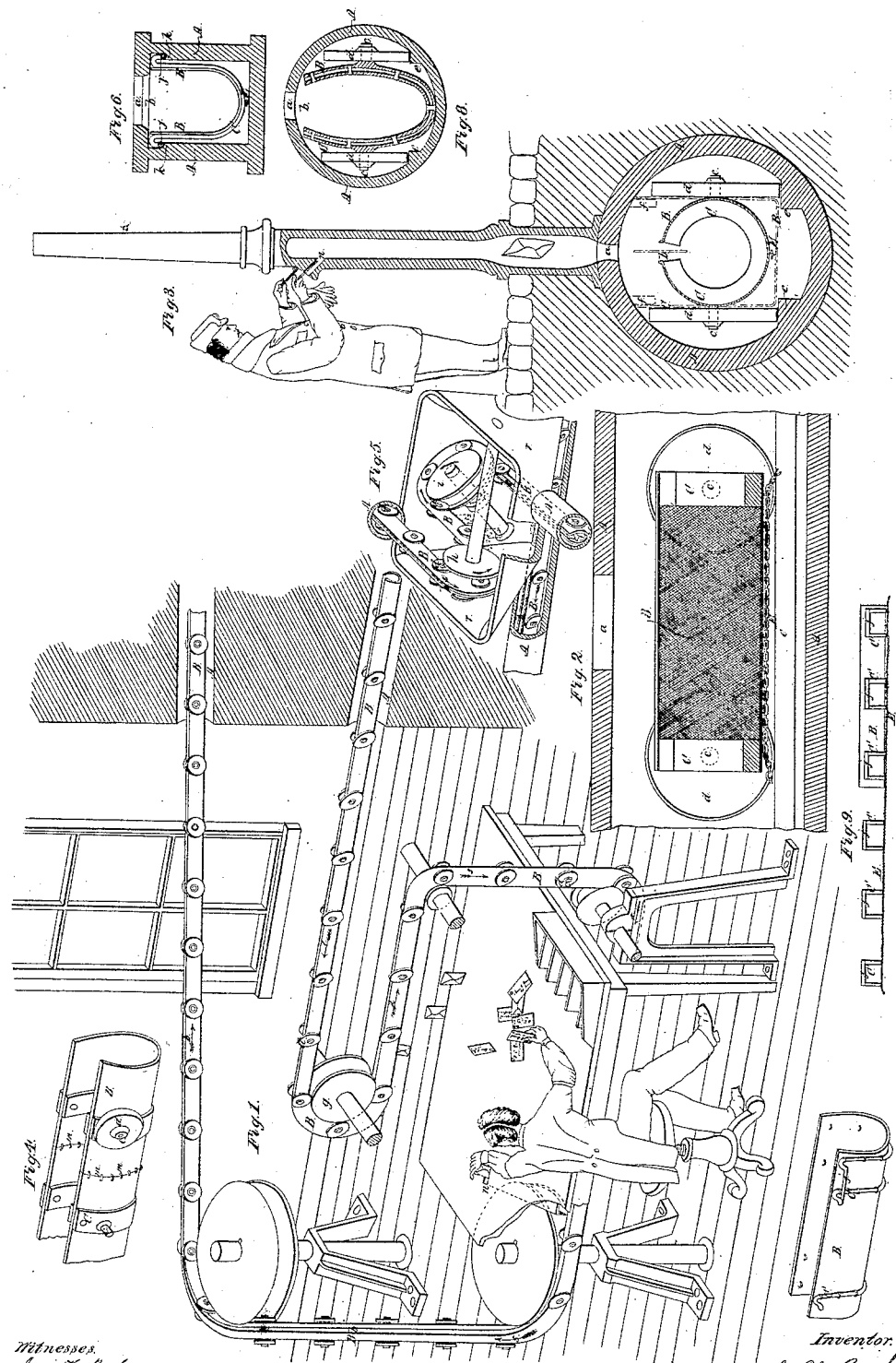

UNITED STATES PATENT OFFICE.

A. ELY BEACH, OF STRATFORD, CONNECTICUT.

IMPROVEMENT IN MODE OF TRANSPORTING AND DELIVERING LETTERS, PACKAGES, &c.

Specification forming part of Letters Patent No. 49,699, dated September 5, 1865.

*To all whom it may concern:*

Be it known that I, A. ELY BEACH, of Stratford, Fairfield county, State of Connecticut, have invented certain new and useful Improvements in Transportation and Delivery of Letters, Packages, and other Freight; and I do hereby declare that the following is a full and exact description of my improvements, which will enable other persons skilled in the art to make and use the same.

Reference is to be had to the accompanying drawings, forming part of this specification, in which similar letters of reference indicate corresponding parts in all of the figures.

Figure 1 is a perspective view illustrating the operation of my improvements in the transportation and delivery of letters at one of the stations. Fig. 2 is a side sectional elevation of a portion of the endless trough, pouch, conveyer or receptacle, and tube through which they move. Fig. 3 is a vertical sectional elevation, showing a portion of the endless trough or pouch, tube, and lamp-post receiving letter-box. The remaining figures illustrate modifications of my improvement.

The object of my invention is to provide a safe, speedy, and economical method of transporting and delivering letters, packages, and all kinds of freight.

The nature of my improvement consists in the employment of an endless belt, cable, or chain of troughs, pouches, or tubular conveyers or receptacles, so constructed and arranged as to form a continuous flexible pouch or receptacle for letters, packages, and other freight, which line or chain of troughs, pouches, or receptacles is caused, by means of steam-power or other motor, to traverse through tubes, grooves, or channels, which cover, protect, or guide the said moving troughs or pouches. The tubes or channels in which the pouches or troughs run are to be made or laid either under ground or upon the surface thereof, or in or upon buildings, posts, bridges, or other structure. The tubes may be made of wood, iron, brick, stone, cement, earthenware, or other suitable material, and may be formed either square, round, oval, or other suitable shape, and may be composed of one or more pieces or sections. The size and form of the tube and pouches will be governed by the size and character of the freight to be transported. The troughs, pouches, or receptacles are to be composed of some suitable strong, flexible or pliable or elastic material, such as wire-cloth, india-rubber, gutta-percha, leather, cloth, thin metal, or combinations of the above materials. The said pouches, conveyers, or receptacles are to be so made that they will form a tubular or trough-shaped endless belt or chain, open either wholly or partially at the top, so that letters, parcels, and other freight may be dropped or deposited therein. The said pouches, conveyers, troughs, or receptacles may be made to slide in suitable grooves or channels, or they may be mounted upon wheels in any suitable manner, which wheels run upon channels, ways, or tracks laid in or upon the tubes; or, if preferable, fixed friction-wheels may be arranged within the bottom of the tube, over which wheels the pouches or conveyers may run, thus avoiding friction. The tube through which the pouches or conveyers run is intended to have openings through its upper part, arranged at suitable intervals, for the introduction of letters and parcels into the pouches for transportation and delivery.

Having thus stated the general principles upon which my improvements are operated, it will be readily understood that there are various mechanical forms which may be employed by persons skilled in the art to carry out my improvements practically. I will, however, proceed to describe some of these various forms, reference being had to the drawings.

A is the tube through which the pouches, troughs, or conveyers travel, and $a$ an opening therein for the introduction of letters, &c.; B, the endless pouches, troughs, conveyers, or receptacles, composed of wire-cloth and having a longitudinal opening or slot, $b$, through the top, which opening $b$ is, in the ordinary course of the travel or movement of the pouches, always directly in line with and under the tube-opening $a$, so that any letters or packages introduced through the tube-opening $a$ will fall down within the interior of the pouches, troughs, or conveyers B.

If the material composing the body of the pouch is not of sufficient rigidity to maintain itself in the tubular or trough form, then the said material is stretched or extended upon suitable frames, C, arranged or attached in any secure manner to the surface of the pouch material at suitable intervals thereupon.

The frames may be provided with axles c and wheels d, which latter run upon rails e, arranged within the tube A, so that the pouches, troughs, or conveyers, being thus mounted upon wheels, may be made to traverse the tube with great rapidity and but little friction. When the material composing the body of the pouches is of sufficient rigidity and strength the axles and wheels may be attached directly to the sides thereof without the use of any frames. The frames C may be connected by a safety-chain, E, so that if the pouches should by accident become ruptured the endless line or chain will not be wholly separated.

Instead of flexible material the pouches or conveyers may be composed of sections of rigid material connected by rings or other flexible joints, so that the sections of the pouches or conveyers may readily accommodate themselves to the turning of street-corners or the surfaces of drums or the undulations of the ground.

Fig. 4 shows a method of making the sections of the pouches of thin metal connected by rings m, the sides of the sections having axles and wheels attached to them. Fig. 8 is a cross-sectional elevation of the same with tube.

In the transportation of letters and freight in cities, the tube-openings a may be arranged under and connected with the hollow bases of lamp-posts or other form of receiving boxes or standards, in such a manner that when letters are passed through a receiving-aperture in the lamp-post, box, or standard the letters will fall through the opening a into the interior of the endless moving pouches or conveyers, by which the letters will be immediately transported to and delivered at the nearest station. (See Fig. 3.) The size of the aperture in the lamp-post n, or in the receiving box or standard, will of course govern the size of the packages that are dropped into the pouches, so that none of undue size will be admitted.

The red lines, Fig. 3, indicate a modified form for the pouches or conveyers, the upper part being open, thus forming a trough into which the letters fall. The pendent ears f f are intended to project down from the roof of the tube below the edges of the troughs or pouches, so as to prevent the escape of their contents.

When the tubes are located under streets or sidewalks, letter slides or receivers may extend from the interior of buildings down to the tubes, so as to convey letters, &c., from the interior of such buildings into the moving pouches.

The method by which the contents of the troughs, pouches, or conveyers are delivered is shown in Fig. 1. The pouches pass in the direction of the arrow 1 around a drum or wheel, g, arranged above a suitable distributing-table, and by this passage the pouches are inverted, moving in an inverted position, as indicated by arrow 2, over the table, during which inversion the letters and packages fall down upon the table or into any suitable receiver. The pouches then pass down under the table and out of the apartment in an upright position, which is imparted to them by passing over the drums, as shown, the arrows 3 4 5 6 indicating the course of the pouches. When the letters and packages are delivered upon the table the attendant selects those that are intended for that station, but returns to the pouches those that require further transportation.

Any desired number of different lines of pouches or conveyers may be caused to deposit their contents upon the tables of a receiving-station.

When different lines or routes of pouches or conveyers cross each other the contents of any crossing or minor line of pouches may be automatically transferred into any main line of pouches or conveyers. A method of effecting this transfer is shown in Fig. 5, in which the upper or minor line of pouches is caused to turn over drums h i, and move sufficiently far in an inverted position as to deliver its contents into a box, r, the bottom of which communicates with an opening into the lower or main line of pouches, so that as fast as the contents of the upper line of pouches are delivered they fall into the main line of pouches. These receiving or transferring boxes may be located under ground or in any other convenient position.

The use of wheels for the support of the endless chain of pouches or conveyers is not necessary, except when the freight to be transported is of a heavy and bulky nature. For the conveyance and delivery of letters, newspapers, small packages, and such articles as are generally carried in the mails, the pouches or conveyers may be supported on frames which slide on grooves or ribs; or the material of which the pouches is composed may have ribs or bars or slides, of any suitable material, attached thereto, which ribs, bars, or slides will run in grooves or channels or upon guides or ribs in the tube.

A method of supporting the endless chain of pouches or conveyers without wheels is illustrated in Figs. 6 and 7, in which the tube A is made of angular form, as shown, the top being removable. The opening through which the letters or packages fall is indicated at a. The endless chain B of pouches or conveyers is composed of leather or any of the other materials before mentioned, the said conveyers being made in the form of a trough, and having attached thereto, at suitable intervals and in any suitable manner, a successive string or series of supporting-frames, C', made of metal, of the form shown or other form. At some convenient part of the supporting-frame there are one or more horizontal bars, j, which form slides upon which the frames C' move. At some suitable point within the tube A' there are to be placed one or more grooved guide rails or bars, $k$, which receive the bars or slides $j$, so that the frames C' will be supported upon or suspended from the said rails, together with the endless chain of pouches or conveyers. When the said rails $k$ are properly made, lined with soft metal, and lubricated, the frames and endless pouches may be moved therein at a high velocity, almost noiselessly, with but little friction.

The endless chain of pouches or conveyers is to be kept in motion by means of revolving drums, over which the endless pouches pass, the faces or surfaces of the drums being scored or formed so as to receive the supporting wheels or frames and the material composing the endless pouches or conveyers and transmit motion thereto, without injury to the contents of the endless pouches or conveyers. The drums by which the endless line of conveyers or pouches are operated will be driven by steam-engines or other motors located at suitable places along the path of the conveyers.

The method of conveying and delivering letters and packages herein described may be put in operation for indefinite distances. The endless pouches or conveyers will, however, be divided into suitable sections or lengths, one half of each section moving in one direction and the other in the contrary direction, similar to the movements of an ordinary endless chain or belt.

By means of the method of transferring the contents of one section or line of conveyers into another line or section, as before described, and illustrated in Fig. 5, it will readily be perceived that a constant transportation of letters and other freight for any desired distance may be easily effected, and the receipt within the pouches and conveyers of the freight may take place at any point upon the line where openings are made in the tube for that purpose. The same remark applies to the delivery of the freight, which may be effected in the manner before described at as many points or stations as may be desired along the path or route of the tubes and endless conveyers or pouches.

In some cases it may be found desirable to have the pouches and conveyers occupy only a portion of the endless line or chain, in which cases the safety-chain E will be sufficient to maintain the continuity of the chain, and the receptacles for the deposit of letters or freight within the pouches will be locked and closed, except at the times when the pouches or conveyers are passing under the receptacles. Fig. 10 illustrates a line of pouches and chains arranged in this manner.

By a suitable enlargement of the tube and conveyers and the application of means for ventilating the tubes, or by the removal of the top thereof, or otherwise forming a suitable channel for the movement of the conveyers, the transportation of passengers in a safe and speedy manner may be effected.

Having thus described my invention, I claim and desire to secure by Letters Patent—

The employment of an endless chain or belt of troughs, pouches, conveyers, or receptacles, moving through tubes or channels, constructed and operating substantially as described, for the transportation and delivery of letters, packages, and all kinds of freight.

A. ELY BEACH.

Witnesses:
PETER COOKE,
OCTAVIUS KNIGHT.